United States Patent [19]

Bachhofer et al.

[11] Patent Number: 4,818,498

[45] Date of Patent: Apr. 4, 1989

[54] OZONE GENERATOR EMPLOYING PLATE-SHAPED HIGH-VOLTAGE ELECTRODES

[76] Inventors: Bruno Bachhofer, Säntisstrasse 85, D-7981 Bavendorf; Anton Locher, Bergstrasse 6, D-7981 Torkenweiler, both of Fed. Rep. of Germany

[21] Appl. No.: 624,706

[22] Filed: Jun. 26, 1984

[51] Int. Cl.$^4$ ............................................. C01B 13/12
[52] U.S. Cl. ............................. 422/186.2; 422/186.07
[58] Field of Search ...................... 422/186.07, 186.11, 422/186.2, 186.08; 204/176

[56] References Cited

U.S. PATENT DOCUMENTS

| | | | |
|---|---|---|---|
| 2,403,241 | 7/1946 | Schaefer | 422/186.07 |
| 3,801,791 | 4/1974 | Schaefer | 422/186.2 X |

FOREIGN PATENT DOCUMENTS 2412770  1/1981  Fed. Rep. of Germany .

OTHER PUBLICATIONS

*The Condensed Chemical Dictionary*, Reinhold Publishing Corp., New York, Fifth edition, 1956, p. 981.

*Primary Examiner*—John F. Terapane
*Assistant Examiner*—Susan Wolffe
*Attorney, Agent, or Firm*—Spencer & Frank

[57] ABSTRACT

In an ozone generator composed of a plurality of plate-shaped high-voltage electrodes and a plate of insulating dielectric material assembled in a stack, the electrodes including at least one externally coolable electrode and at least one counter-electrode, with the plate of insulating material being disposed between the externally coolable electrode, so as to bear thereagainst, and the counter-electrode, while being spaced from the counter-electrode to form a discharge space, a layer of viscous material is interposed between, and contacts the externally coolable electrode and the plate.

2 Claims, 1 Drawing Sheet

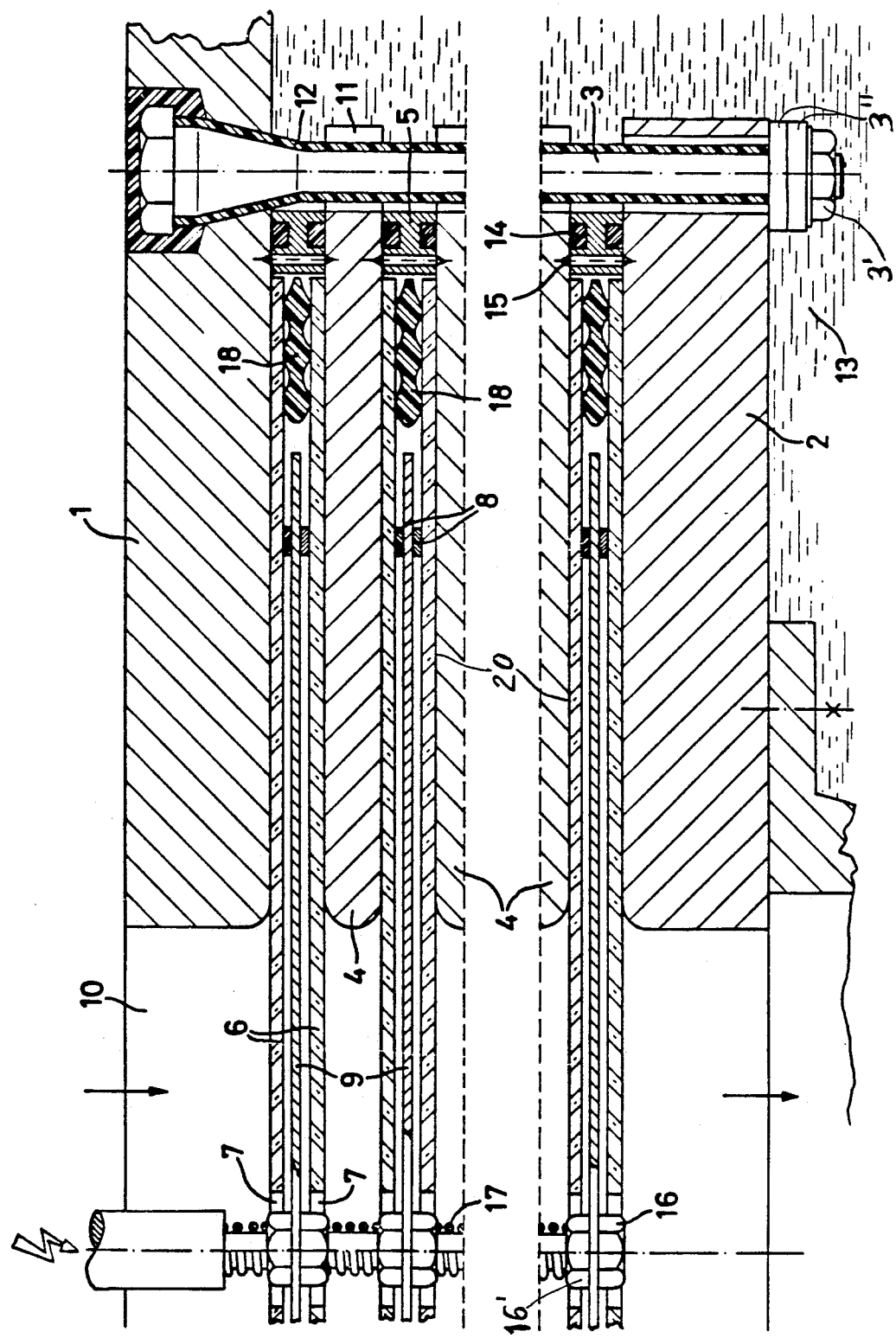

OZONE GENERATOR EMPLOYING PLATE-SHAPED HIGH-VOLTAGE ELECTRODES

BACKGROUND OF THE INVENTION

The present invention relates to an ozone generator of stack-type design, employing plate-shaped high-voltage electrodes, including externally coolable electrodes and counter-electrodes, which are braced counter to one another, two plates, made of an insulating material, being located between two coolable electrodes which are spaced one from the other, and a counter-electrode being located between the plates which are made of an insulating material, thereby forming two discharge spaces with the plates.

An ozone generator of this type is disclosed in German Pat. No. 2,412,770. In this generator, comparatively thick, solid aluminum cooling electrodes are provided, taking the form of ring-shaped plates, supported, one against another, by means of their edge portions, which project axially in a pot or dish-like manner. The cooling electrodes are overlaid, on both sides, by ring-shaped glass plates which are at least 3 mm thick and overhang in the radially inward direction. A disc-shaped counter-electrode is located between the adjacent glass plates, this counter-electrode being supported, by means of small spacers, at a distance of approximately 1 mm from each of the glass plates, and forming, with these plates, two discharge spaces. The process gas flows through the shallow, ring-shaped discharge spaces, radially outwards and radially inwards, alternately.

Experience has shown that the glass plates frequently break while operating ozone generators of this type. The use of thicker and, in consequence, more stable glass is excluded, since this entails an increase in the dielectric losses and a reduction in the field intensity in the discharge spaces, resulting in a reduction in the ozone yield. Vibrations of the glass plates are the possible cause of these breakages. Even highly accurate machining of the flat areas of the solid cooling electrodes, on which the glass plates rest, does not allow the thickness of the glass to be reduced to below 2 mm.

SUMMARY OF THE INvENTION

The object underlying the invention is to prevent the above-mentioned glass breakages and the interruptions in operation which are associated therewith, while additionally effecting a further reduction in the thickness of the glass, with the aim of obtaining improved operating data.

Starting from an ozone generator of the type indicated in the introduction, this object is achieved, according to the invention, when a thin, sticky, or viscous, layer is provided between the cooling electrodes and the dielectric material. By this means, the glass plates are caused to adhere to the solid cooling electrodes and, in consequence, are unable to vibrate at their natural frequencies or, if they do, these natural-frequency vibrations are damped. In addition, the sticky layer improves the transfer of the dielectric heat to the cooling electrode. The sticky layer can be composed of silicone oil, which is preferred. At the same time, experience shows that once the oil-smeared glass plate has been placed on the flat surface of the cooling electrode, it cannot be removed again other than by sliding it off.

The thickness of the glass plates can be reduced down to approximately 1.2 mm. If a small extra safety allowance is made, and a thickness of 1.5 mm is chosen, it has been proved that the risk of glass breakage can be completely eliminated. In addition, the use of thinner glass——counter to the conventional reasoning mentioned in the introduction—results in a higher ozone yield, and this is so, moreover, on two accounts. On the one hand, making the assumption that both the size of the discharge gap and the voltage remain the same, the field intensity in the discharge gap increases. As a result, more ozone is formed. On the other hand, the dielectric losses in the dielectric material fall, and the temperature in the discharge space falls with them, leading to a lowering of the ozone redecomposition rate. As a result, more of the ozone which is produced remains available for use.

BRIEF DESCRIPTION OF THE DRAWING

In the text which follows, an illustrative embodiment of the invention is explained by reference to the sole drawing Figure, which shows in partial cross section a portion of an ozone generator, in a plane lying in the axial direction, and approximately 1.5 times actual size.

DESCRIPTION OF THE PREFERRED EMBODIMENTS

The components of the ozone generator, which are disposed in a casing (not shown) and are assembled to form a stack, are clamped between two pressure plates 1 and 2 which are held together by means of a circular array of clamping bolts 3 spaced around the periphery of the stack. A plurality of cooling electrodes 4, in the form of ring-shaped aluminum plates 8 mm thick, are spaced from one another, or from the pressure plates 1 and 2, as the case may be, by means of plastic spacer rings 5. Glass plates 6, 1.5 mm thick, bear against the pressure plates 1 and 2, and against the cooling electrodes 4. Each of these glass plates 6 possesses a central opening 7 centered on the axis of the stack. A counter-electrode 9 is held, with the aid of small, thin spacer plates 8, midway between each two adjacent glass plates 6, the thickness of this counter-electrode 9, and its spacing from each glass plate 6, being approximately 1 mm.

Each of the pressure plates 1 and 2 has a central, circular opening 10, of the same diameter as the central openings in the cooling electrodes 4. At their outer edges, the cooling electrodes 4 possess open slots 11, in order to permit the clamping bolts 3 to pass through, each of these bolts 3 being sheathed with a flexible, insulating tube 12, while their heads are potted in epoxy resin in order to insulate them. At the bottom, the nut 3' is supported against the pressure plate 2 via washers 3" which are made of an insulating material. The purpose of insulating the clamping bolts 3 is to avoid corrosion phenomena resulting from electrochemical processes between the various metals.

In order to seal the interior space with respect to the water 13 which is circulating around the ozone generator, two sealing rings 14 are embedded into each of the spacer rings 5. Radially inwardly of these sealing rings 14, the spacer rings 5 possess one or two holes, drilled parallel to the axis of the assembly and containing steel pins 15. The pointed ends of these pins 15 penetrate the cooling electrodes 4 or, as the case may be, the pressure plates 1 and 2, to a depth of approximately 0.3 mm, in order to provide an equipotential interconnection.

Each of the counter-electrodes 9 possesses a central hole, through which a respective bolt 16 is inserted. The head of each bolt is clamped to its associated counter-electrode 9 by means of an associated nut 16'. Each bolt head and associated nut 16' further serve to seal the central hole in the associated counter-electrode 9. The head of each bolt 16 is provided with a recess for receiving the end of the bolt 16 associated with the next succeeding counter-electrode 9. A compression spring 17 is slipped over the shaft of each bolt 16, this compression spring 17 bearing against the next bolt head with a certain prestress. By this means, all the counter-electrodes 9 are electrically interconnected to a high voltage head. They are at a high electrical potential, ranging up to 12,000 volts.

Those areas of the pressure plates 1 and 2, and of the cooling electrodes 4, against which the glass plates 6 bear, are rendered flat, to a high degree of accuracy, and are smeared with silicone oil 20 during assembly, before placing the glass plates 6 on them. This oil causes the glass plates 6 to adhere, and prevents vibrations, while on the other hand, the dielectric heat produced can transfer to the cooling electrodes 4 even more efficiently.

In order to assure adequate dielectric strength in the radial direction, between the counter-electrodes 9 and the steel pins 15, or, as the case may be, the outer edges of the cooling electrodes 4, gasket rings 18 are provided, which are squeezed, in the edge zone, between two adjacent glass plates 6. These gasket rings 18 are composed of a silicone. They possess three radially spaced beads on each of the sides facing the glass. This arrangement produces the effect of a cascade of three individual seal locations, the air in the annular chambers formed by each pair of adjacent beads and the common glass surface being expelled during the compression process. In the course of time, the chemical action of the ozone causes the silicone gasket ring to become tough and hard. This, however, does not impair its breakdown-inhibiting effect, but it bakes firmly onto the glass.

The gasket ring 18 permits the diameter of the counter-electrodes 9 to be enlarged, in relation to the diameter of the glass plates 6, and to the diameter of the cooling electrodes 4 of known ozone generators, this enlargement implying a considerable enlargement of the area of the reaction space, and an increase in the length of the process gas flow path, without any changes in the external dimensions of the ozone generator.

In the case of the ozone generator which has been described, dried air is used as the process gas. It enters through the opening 10 in the pressure plate 1, and then passes, through the opening 7 in the uppermost glass plate 6, into the discharge space between this plate 6 and the uppermost counter-electrode 9. Here, the air travels radially outwards, flows around the edge of the above-mentioned counter-electrode, and travels back on its underside, radially inwards, in order to travel through the openings 7 in the glass plates 6 which follow, and outwards again, in the next discharge space, and so on.

Measurements on an ozone generator, possessing six counter-electrodes and the other dimensions which have been mentioned previously, have yielded results indicating an ozone yield of 27 g per hour, which corresponds to 45 g of ozone per cubic meter of process air under standard conditions, in association with an energy requirement of 17 watt-hours per gram of ozone.

A suitable silicone oil used to coat the glass plates, which is commercially available, is for example: Wacker Siliconöl TR 50, produced by Wacker-Chemie GmbH, D-8000 München 22, Federal Republic of Germany. Viscosity of that oil is 55 mm$^2$/s at 20 ° C. The silicone oil is applied by the help of a brush or a sprayer. Exemplary values for the thickness of such a layer, before the assembly of the parts, are between 50 um and 100 um (micrometer).

It will be understood that the above description of the present invention is susceptible to various modifications, changes and adaptations, and the same are intended to be comprehended within the meaning and range of equivalents of the appended claims.

What is claimed is:

1. In an ozone generator composed of a plurality of plate-shaped high-voltage electrodes and a plate of insulating dielectric material assembled in a stack, the electrodes including at least one externally coolable electrode and at least one counter-electrode, with the plate of insulating material being disposed between the externally coolable electrode and the counter-electrode, the plate of insulating material being pressed against the externally coolable electrode while being spaced from the counter-electrode to form a discharge space, the improvement comprising silicone oil interposed between, and contacting, said externally coolable electrode and said plate.

2. Ozone generator according to cliam 1, wherein said plate is made of glass, and is approximately 1.5 mm thick.

* * * * *